Figure 1:
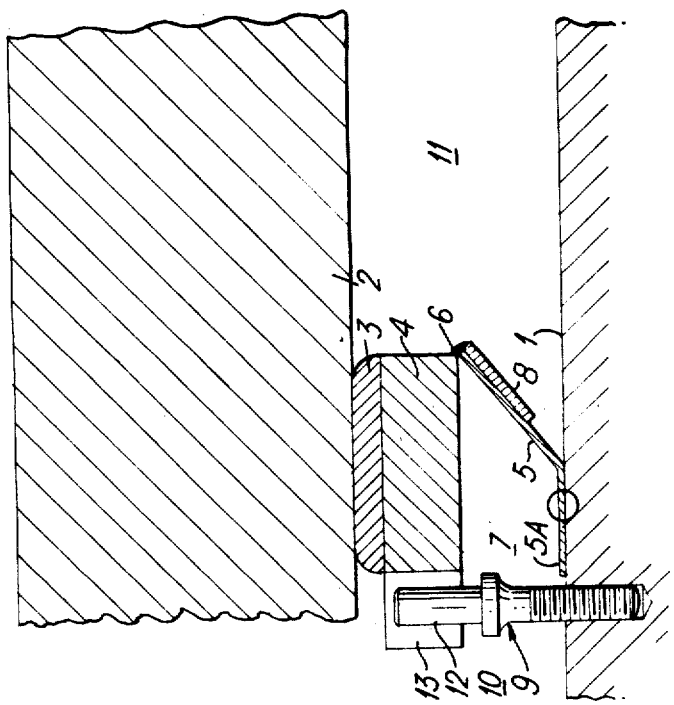

United States Patent
Barnard

[15] 3,692,098
[45] Sept. 19, 1972

[54] THERMAL REGENERATORS
[72] Inventor: Mark Cary Sedgwick Barnard, Kenilworth, England
[73] Assignee: Leyland Gas Turbines Ltd., Solihull, Warwick, England
[22] Filed: Feb. 2, 1971
[21] Appl. No.: 111,948

[52] U.S. Cl. .................. 165/9, 277/235 R, 277/96
[51] Int. Cl. ............................................. F28d 19/03
[58] Field of Search ......... 165/9; 277/235 R; 385/363

[56] References Cited
UNITED STATES PATENTS

| | | | |
|---|---|---|---|
| 3,534,808 | 10/1970 | Carroll | 165/9 |
| 3,542,122 | 11/1970 | Bracken, Jr. | 165/9 |
| 2,250,813 | 7/1941 | Rea | 285/363 X |
| 3,273,903 | 9/1966 | Chapman et al. | 165/9 X |

Primary Examiner—Albert W. Davis, Jr.
Attorney—Holcombe, Wetherill & Brisebois

[57] ABSTRACT

A thermal regenerator having a rotary disc-type matrix enclosed in a casing which is traversed by two segregated flows of gaseous heat-exchanging fluids; and which is equipped with a sealing assembly which comprises: an endless counterface sealing pad that makes rubbing contact with the corresponding face of the matrix; a support ring carrying the sealing pad; a flexible sealing curtain of very thin metal secured to the support ring so as to be hingeable about a corner thereof, and extending obliquely across a gap existing between the support ring and the casing; a resilient backing member of sheet metal thicker than the curtain and secured to the support ring, which backing member supports the curtain and acts as a weak spring to maintain the pad in contact with the matrix; and seal-locating means permitting freedom of movement of the pad in a plane normal to the face of the matrix, and effective also to resist the torque applied frictionally to the pad by the rotation of the matrix.

3 Claims, 2 Drawing Figures

THERMAL REGENERATORS

This invention relates to thermal regenerators (otherwise known as regenerative heat-exchangers) of the kind employing a moving matrix, e.g. a rotary disc-type matrix.

Thermal regenerators of the kind referred to are usually incorporated in gas turbine power plants to extract heat from the exhaust gases, and to transfer it to the compressed intake-air before this enters the combustion chamber of the gas turbine engine. The rotary disc-type matrix normally employed, which is housed in the casing of the engine, comprises a foraminous refractory core (e.g. of ceramic or glass-ceramic material) formed with a multitude of open-ended, thin-walled passages lying substantially parallel to its rotational axis. Sector-like zones of the core are caused (by its rotation) to be presented alternately to the flow of the exhaust gases and to the flow of the compressed intake-air. In that way the required heat transference is effected.

It is, of course, necessary to segregate the two gaseous flows at all times, and to minimize leakage between the high-pressure zone, occupied by the compressed intake-air, and the low-pressure zone occupied by the exhaust gases. To this end, it is common practice to employ a sealing element that makes rubbing contact with the corresponding face of the matrix, and which is mounted on a flexible member fixed to the casing of the engine. The intended purpose of the flexible mounting is to maintain contact between the matrix face and the counterface of the sealing element, thus sealing the high-pressure air, despite the quite considerable differential expansion which occurs between the engine casing and the matrix at high temperatures. As the air-pressure varies, so the intensity of the rubbing load must remain within definite limits set by the ability of the sealing assembly to seal efficiently on the one hand, and to avoid excessive rubbing loads (which are conductive to damage or rapid wear, or both) on the other hand. The same sealing assembly may also be used to support loads from the matrix disc, and to help retain its correct location.

According to this invention a thermal regenerator, of the kind having a rotary disc-type matrix enclosed in a casing which is traversed by two segregated flows of gaseous heat-exchanging fluids, is equipped with a sealing assembly which comprises: an endless counterface sealing pad that makes rubbing contact with the corresponding face of the matrix; a support ring carrying the sealing pad; a flexible sealing curtain of very thin metal secured to the support ring so as to be hingeable about a corner thereof, and extending obliquely across a gap existing between the support ring and the casing; a resilient backing member of sheet metal thicker than the curtain and secured to the support ring, this backing member supporting the curtain and also acting as a weak spring to maintain the pad in contact with the matrix; and seal-locating means permitting freedom of movement of the pad in a plane normal to the face of the matrix, and effective also to resist the torque applied frictionally to the pad by the rotation of the matrix.

FIG. 1 of the accompanying drawing is a schematic fragmentary sectional plan view of a sealing assembly in accordance with the invention, applied to a rotary-disc regenerator of a gas turbine engine.

Figure 1A:
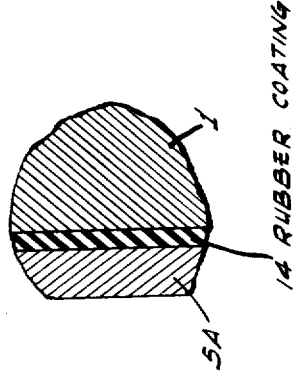

FIG. 1A is an enlargement of the portion of the assembly shown in the circle in FIG. 1.

In the embodiment illustrated, a casing 1 (which, during operation of the gas turbine engine, is traversed by two segregated flows of gaseous heat-exchanging fluids) encloses a rotary disc-type matrix 2 of a thermal regenerator. The latter is equipped with a sealing assembly which comprises: an endless counterface sealing pad 3 that makes rubbing contact with the corresponding face of the matrix 2; a support ring 4 carrying the sealing pad 3; a flexible sealing curtain 5 of very thin metal secured to the support ring 4 so as to be hingeable about a corner 6 thereof, and extending obliquely across a gap 7 existing between the support ring 4 and the casing 1; a resilient backing member 8 of sheet metal thicker than the curtain 5 which is secured to the supporting ring 4; and seal-locating means 9. The high-pressure zone, traversed by the compressed intake-air before this flows through the matrix 2, is indicated at 10; and the low-pressure zone, occupied by the exhaust gases, is indicated at 11.

The counterface sealing pad 3 preferably comprises a material, such as mild steel, which is of sufficiently low strength to ensure that thermal and other physical distortions will be accommodated by the air-pressure loading to retain the pad in contact with the face of the matrix disc 2; and yet strong enough to withstand the collapsing loads of the air-pressure differential, and other loads such as the torque due to friction between the rotating disc and the stationary sealing pad 3. If the pad is of composite form, the material used for its foundation (i.e. main component) must also have an appropriate coefficient of expansion, such that the material is compatible with various possible coatings, such as nickel oxide, or with bonded blocks of rubbing material such as graphite. The counterface pad 3 may incorporate any kind of coating or block that is serviceable for the sealing function.

The resilient backing member 8 may, for example, be fabricated from a 0.010 inch sheet of a nickel-based alloy having substantially the composition: 75% nickel, 20% chromium, 5% iron. This member has slots extending across its free width and terminating in holes to prevent crack-spreading. The slots create intervening springy tongues, so that the backing member acts as a weak spring to keep the seal surface in contact with the matrix disc. It also supports the very thin curtain 5 to enable this to withstand the air-pressure difference between the zones 10 and 11, which may be 50 p.s.i. or more. The dimensions of the pad 3 and the backing member 8 are such as to effect the control of air-pressure loading on the seal surface and the disc face.

The metal curtain 5 may be made of nickel-plated copper sheet of about 0.002 inch in thickness, which easily deforms to conform to the backing member 8 and the casing 1. The air-pressure will keep the free edge zone 5A of the curtain 5 hard against the casing, and thus effect a seal. To improve the efficiency of this seal, a thin coating 14 of silicone rubber is applied to the underside of the portion 5A that seats upon the casing 1 as shown in FIG. 1A.

When the air-pressure is removed the curtain 5 may need to be forcibly maintained in contact, or nearly in contact, with the casing 1. Ideally, this may be effected by the free edge zone 5A of the curtain lying flat; so that, when the engine is started and air-pressure is built up in the "high" region 10, the curtain 5 is able to seal in a condition of very low pressure, well before engine idle speed is reached. However, other means may be necessary, such as a form of trap-plate (not shown) to keep the free edge zone 5A of the curtain on the surface of the casing 1; or an arrangement of springs throughout that zone to effect the same end (and probably also to assist the support to load the pad 3 onto the matrix disc 2 before air-pressure builds up, for example, during engine starting).

The seal-locating means 9 comprises three pegs 12 secured to the casing 1 and spaced around the periphery of the support ring 4, which has three slots 13 to receive the pegs 12. This locating means permits freedom of movement of the sealing pad 3 in a plane normal to the face of the matrix 2, and is effective also to resist the torque applied frictionally to the pad 3 by the rotation of the matrix.

To resist the thrust loads on the matrix disc 2 towards that surface of the casing 1 on which the sealing assembly is mounted, and to prevent collapse of the backing member 8 and the curtain 5, stops (not shown) can be placed at strategic places behind the pad 3. Axial movement of the disc 2 in one direction causes the pad 3 to come into contact with the stops, and therefore positive location of the disc is achieved. When axial movement of the disc 2, within a limited distance, takes place in the opposite direction the sealing assembly is biased by the air-pressure to follow the disc, with the result that the counterface pad 3 remains in contact with the disc. Consequently, the angle between the base of the pad assembly 3,4 and the backing member 8 (and hence the supported curtain 5) increases and the lip (i.e. the free edge zone 5A) of the curtain drags along the casing surface; and this is why that lip 5A must have a predetermined degree of freedom of movement.

I claim:

1. A thermal regenerator of the kind having a rotary disc-type matrix enclosed in a casing which is traversed by two segregated flows of gaseous heat-exchanging fluids; characterized by being equipped with a sealing assembly which comprises: an endless counterface sealing pad that makes rubbing contact with the corresponding face of the matrix; a support ring carrying the sealing pad; a flexible sealing curtain of very thin metal secured at one end thereof to the support ring so as to be hingeable about a corner thereof the other end of said sealing curtain having a thin coating thereon of silicone rubber for slidingly engaging with said casing, said sealing curtain extending obliquely across a gap existing between the support ring and the casing; a resilient backing member of sheet metal thicker than the curtain and secured to the support ring, this backing member supporting the curtain and also acting as a weak spring to maintain the pad in contact with the matrix and said sealing curtain in contact with said casing, and seal-locating means permitting freedom of movement of the pad in a plane normal to the face of the matrix, and effective also to resist the torque applied frictionally to the pad by the rotation of the matrix.

2. A thermal regenerator according to claim 1, in which the sealing curtain is made of nickel-plated copper sheet of about 0.002 inch in thickness.

3. A thermal regenerator according to claim 1, in which the resilient backing member is fabricated from 0.010 inch sheet of a nickel-based alloy having substantially the composition: 75% nickel, 20% chromium, 5% iron.

* * * * *

UNITED STATES PATENT OFFICE
CERTIFICATE OF CORRECTION

Patent No. 3,692,098          Dated September 19, 1972

Inventor(s) MARK CARY SEDGWICK BARNARD

It is certified that error appears in the above-identified patent and that said Letters Patent are hereby corrected as shown below:

[30]      Foreign Application Priority Data
    February 27, 1970         Great Britain      9612/70

Signed and sealed this 13th day of February 1973.

(SEAL)
Attest:

EDWARD M. FLETCHER, JR.                ROBERT GOTTSCHALK
Attesting Officer                      Commissioner of Patents